United States Patent
Yen et al.

(10) Patent No.: US 8,538,359 B2
(45) Date of Patent: Sep. 17, 2013

(54) METHODS AND APPARATUSES OF NETWORK SYSTEM WITH POWER SAVING FUNCTIONS

(75) Inventors: Kuang-Yu Yen, Hsinchu County (TW); Yi-Shou Hsu, Hsin-Chu (TW); Lien-Pang Liao, Hsinchu (TW); Jia-Ching Shen, Taipei (TW)

(73) Assignee: Realtek Semiconductor Corp., Hsinchu (TW)

( * ) Notice: Subject to any disclaimer, the term of this patent is extended or adjusted under 35 U.S.C. 154(b) by 453 days.

(21) Appl. No.: 12/765,888

(22) Filed: Apr. 23, 2010

(65) Prior Publication Data
US 2010/0273519 A1    Oct. 28, 2010

Related U.S. Application Data

(60) Provisional application No. 61/171,844, filed on Apr. 23, 2009.

(51) Int. Cl.
*H01Q 11/12*    (2006.01)
*H04B 1/04*    (2006.01)

(52) U.S. Cl.
USPC ............. 455/127.5; 455/572; 455/343.1

(58) Field of Classification Search
USPC ...... 455/572, 574, 127.1–127.5, 343.1–343.6
See application file for complete search history.

(56) References Cited

U.S. PATENT DOCUMENTS

| | | | |
|---|---|---|---|
| 8,024,591 B2 | 9/2011 | Bertelsen et al. | |
| 2004/0100923 A1* | 5/2004 | Yam | 370/328 |
| 2005/0246431 A1* | 11/2005 | Spitaels | 709/222 |
| 2008/0070330 A1* | 3/2008 | Wada et al. | 438/15 |
| 2008/0159244 A1* | 7/2008 | Hunziker | 370/338 |
| 2008/0186231 A1* | 8/2008 | Aljadeff et al. | 342/387 |

* cited by examiner

*Primary Examiner* — Christian Hannon
(74) *Attorney, Agent, or Firm* — McClure, Qualey & Rodack, LLP (57) ABSTRACT

A network system includes a wireless network device, a network control device, and a first controller. The wireless network device includes an RF unit for transmitting/receiving frames and a first connection interface unit. The network control device includes a second connection interface unit, wherein the second connection interface unit is coupled to the first connection interface unit via a transmission connection, in order to perform data transmission with the first connection interface unit. When there is no data transmitted via the transmission connection, the first controller turns off at least one of power supplies of the first connection interface unit and the second connection interface unit. The first controller may be disposed in the network control device or the wireless network device.

15 Claims, 10 Drawing Sheets

METHODS AND APPARATUSES OF NETWORK SYSTEM WITH POWER SAVING FUNCTIONS

CROSS REFERENCE TO RELATED APPLICATIONS

This application claims the priority of U.S. Provisional Application No. 61/171,844 filed Apr. 23, 2009, which is included herein by reference.

BACKGROUND OF THE INVENTION

1. Field of the Invention

The present invention relates to a network system, and more particularly, to methods and apparatuses of a network system with power saving functions.

2. Description of the Prior Art

Most network systems have an Ethernet switch embedded within their network control chips. The Ethernet switch may include a plurality of transport ports, but sometimes only a part of the transport ports are in use. Those powered-on yet unused transport ports (i.e., the unlinked transport ports) will result in waste of power consumption. If there is no data to be transmitted, the current network systems usually enter the power saving mode with their connection interface units maintained activated and consuming power.

SUMMARY OF THE INVENTION

Methods and apparatuses of a network system with power saving functions are disclosed to solve the abovementioned problems.

In an exemplary embodiment, a network system with power saving functions is provided. The network system includes a wireless network device, a network control device, and a first controller. The wireless network device includes an RF unit for transmitting and receiving frames and a first connection interface unit. The network control device includes a second connection interface unit, wherein the second connection interface unit is coupled to the first connection interface unit via a transmission connection, in order to perform data transmission with the first connection interface unit. When there is no data transmitted via the transmission connection, the first controller turns off at least one of power supplies of the first connection interface unit and the second connection interface unit. The first controller may be disposed in the network control device or the wireless network device.

In an exemplary embodiment, a network control device is provided. The network control device includes a network switch and a controller. The network switch includes a plurality of transports for switching information. The controller is coupled to the network switch. When at least one transport port of the plurality of transport ports is not linked, the controller turns off the power supply of the at least one unlinked transport port. The network control device is applied to a network system. When the controller turns off the power supply of the at least one unlinked transport port of the plurality of transport ports, the network system enters an AP mode; and when the controller restarts the power supply of the at least one transport port used to be turned off, the network system enters a router mode.

In an exemplary embodiment, a power saving method applied to a network system is provided. The network system includes a wireless network device and a network control device; wherein the wireless network device includes an RF unit for transmitting and receiving frames and a first connection interface unit; and the network control device includes a second connection interface unit being coupled to the first connection interface unit via a transmission connection. The power saving method includes the following steps: detecting a data transmission status of the transmission connection; and when there is no data transmitted via the transmission connection, turning off at least one of power supplies of the first connection interface unit and the second connection interface unit.

These and other objectives will no doubt become obvious to those of ordinary skill in the art after reading the following detailed description of the embodiment that is illustrated in the various figures and drawings.

DETAILED DESCRIPTION

Figure 1:
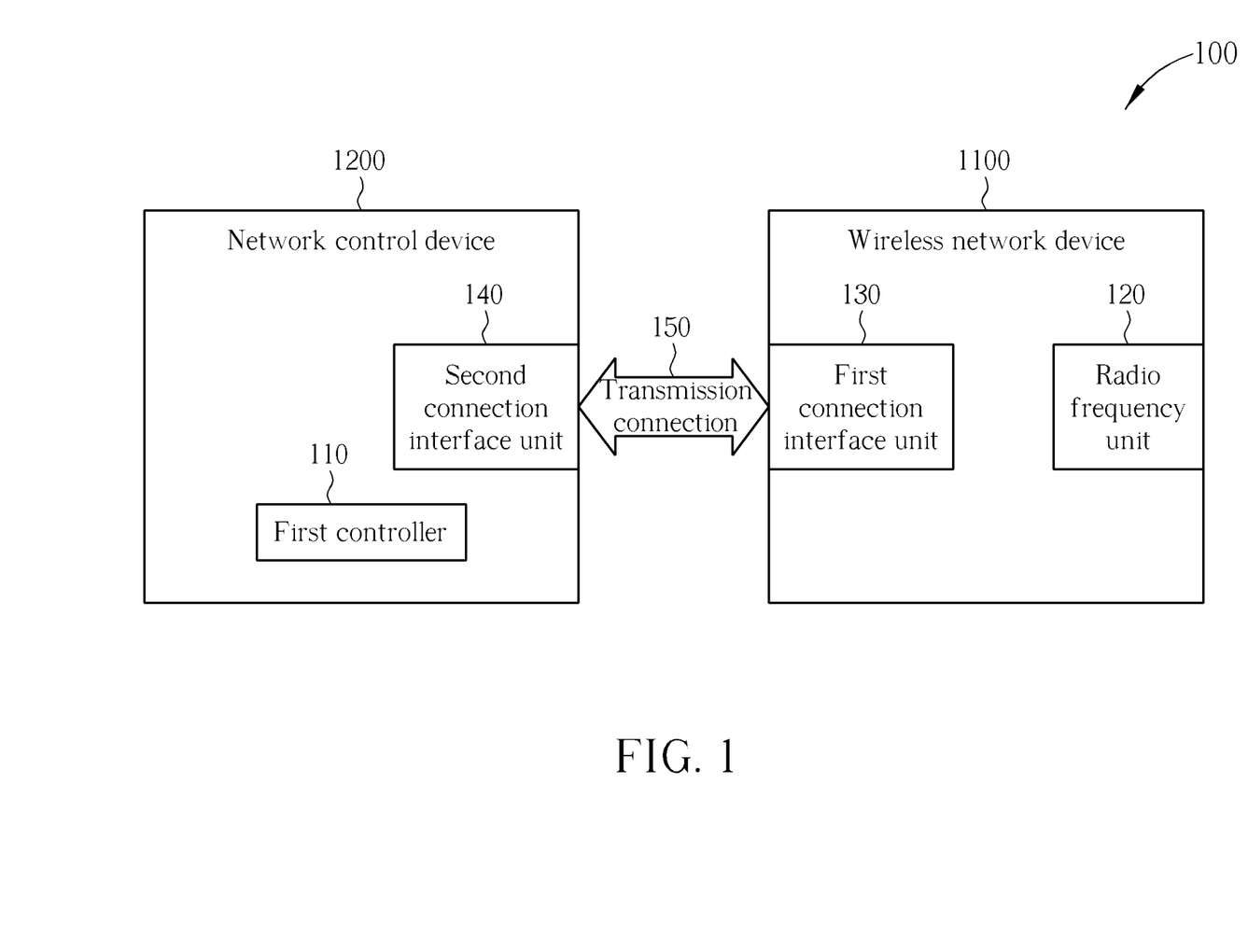
FIG. 1 is a diagram of a first exemplary embodiment of a network system.

Please refer to FIG. 1. FIG. 1 is a diagram of an exemplary embodiment of a network system 100. As shown in FIG. 1, the network system 100 includes, but is not limited to, a wireless network device 1100, a network control device 1200, and a first controller 110. The wireless network device 1100 includes a radio frequency (RF) unit 120 for transmitting/receiving frames and a first connection interface unit 130. The network control device 1200 includes a second connection interface unit 140. The second connection interface unit 140 is coupled to the first connection interface unit 130 via a transmission connection 150, in order to perform data transmission with the first connection interface unit 130. When there is no data transmitted via the transmission connection 150 (i.e., entering idle mode), the first controller 110 turns off at least one of power supplies of the first connection interface unit 130 and the second connection interface unit 140. In other words, the first controller 110 can determine whether to turn off or turn on the power supply of the first connection interface unit 130 and/or the power supply of the second connection interface unit 140. In one embodiment, when there is no data transmitted via the transmission connection 150, the first controller 110 turns off the power supplies of both the first connection interface unit 130 and the second connection interface unit 140 so as to achieve an optimum power-saving performance. However, this is merely an exemplary embodiment, but the present invention is not limited to this only.

Figure 2:
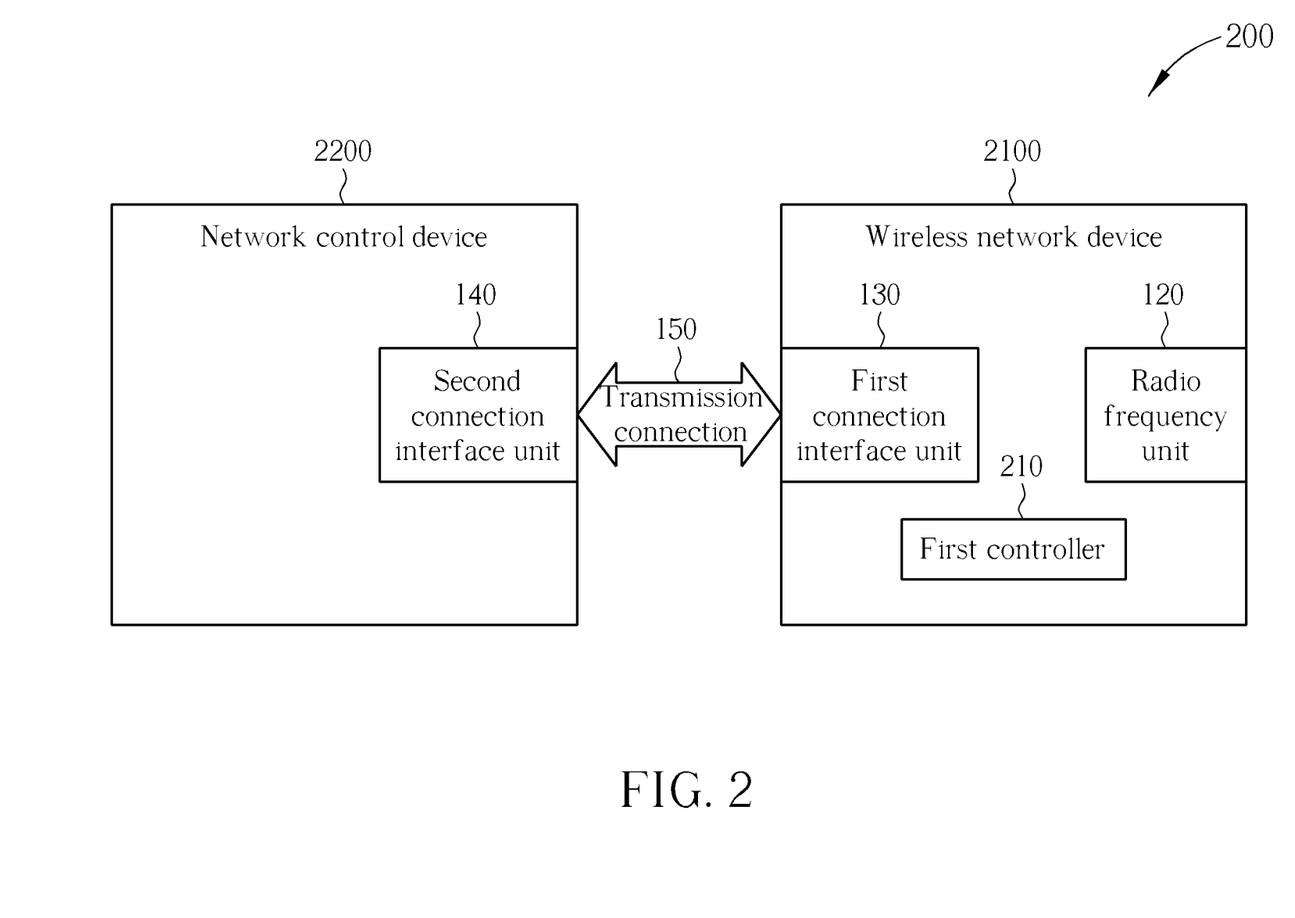
FIG. 2 is a diagram of a second exemplary embodiment of a network system.

Please note that, in FIG. 1, the first controller 110 is disposed in the network control device 1200 of the network system 100, but the scope of the present invention is not limited to this embodiment. Actually, the first controller 110 may be disposed in the network control device 1200 or the wireless network device 1100 depending on design considerations. As an illustration, in other embodiments (as is shown in FIG. 2), a first controller 210 of the network system 200 can be disposed in the wireless network device 2100, for determining whether to turn off or turn on the power supply of the first connection interface unit 130 of the wireless network device 2100 and/or the power supply of the second connection interface unit 140 of the network control device 2200.

Please also note that the transmission connection may conform to a peripheral component interconnect (PCI) standard, a PCI-Express standard, a mini-PCI standard, or a universal serial bus (USB) standard, but the scope of the present invention is not limited to this embodiment.

Figure 3:
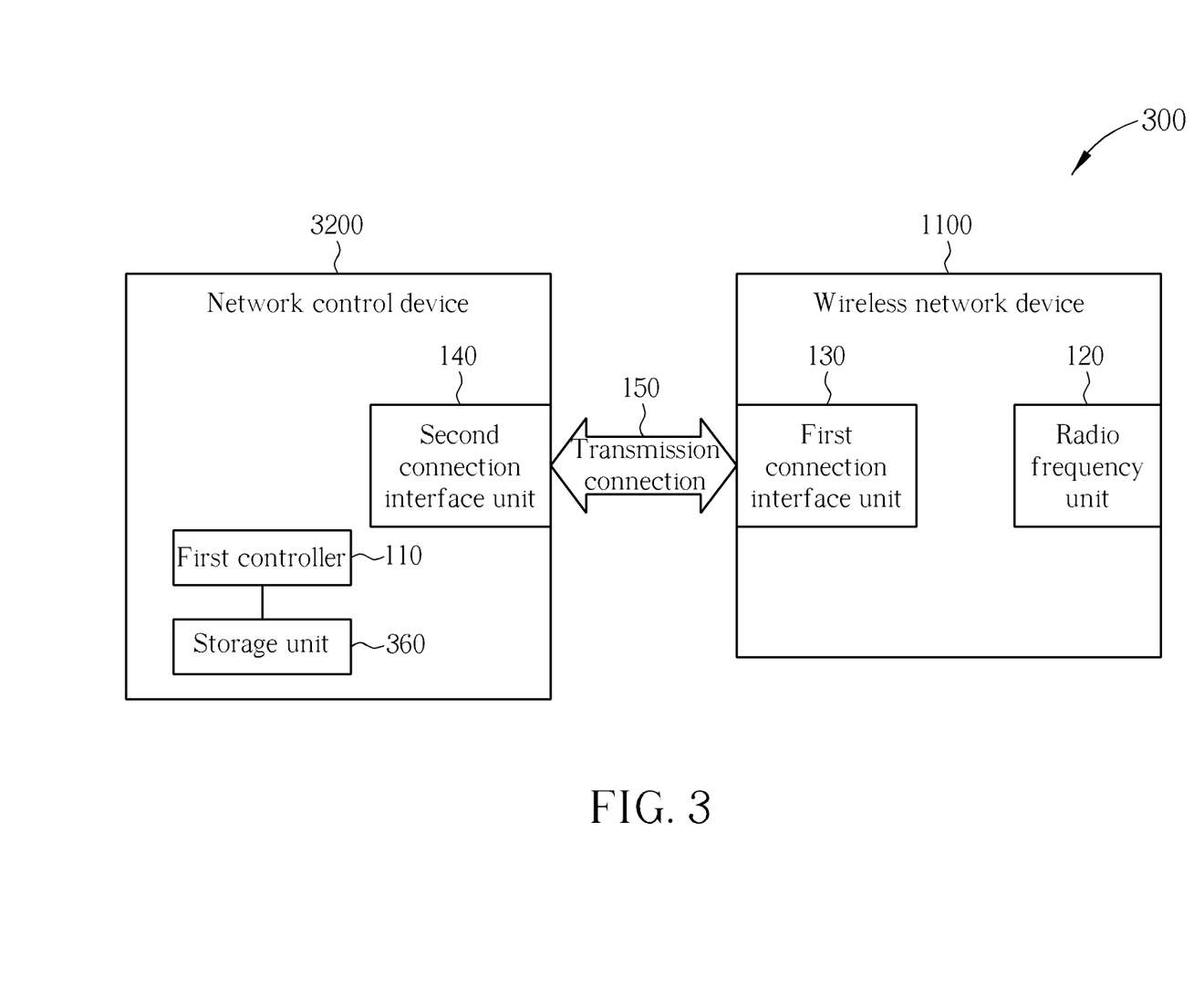
FIG. 3 is a diagram of a third exemplary embodiment of a network system.

Please refer to FIG. 3. FIG. 3 is a diagram of a third exemplary embodiment of a network system 300. The architecture of the network system 300 shown in FIG. 3 is similar to that of the network system 100 shown in FIG. 1, and the difference between them is that a network control device 3200 of the network system 300 further includes a storage unit 360 for storing the data generated during operations of the network control device 3200 and/or data to be processed by the network control device 3200. When there is no data transmitted via the transmission connection 150, the first controller 310 further turns off the power supply of the storage unit 360 in order to save more power. In this embodiment, the storage unit 360 may be implemented by a synchronous dynamic random access memory (SDRAM), but the present invention is not limited to this only.

On the other hand, since the power supply of the first connection interface unit 130 and/or the power supply of the second connection interface unit 140 have been turned off after entering the idle mode, a wake-up mechanism is required for the wireless network device and the network control device in order to wake each other up (please also refer to the follow-up embodiments in FIG. 4~FIG. 7), such that any of the connection interface units can enter the normal mode (i.e., the data transmission state) from the idle mode.

Figure 4:
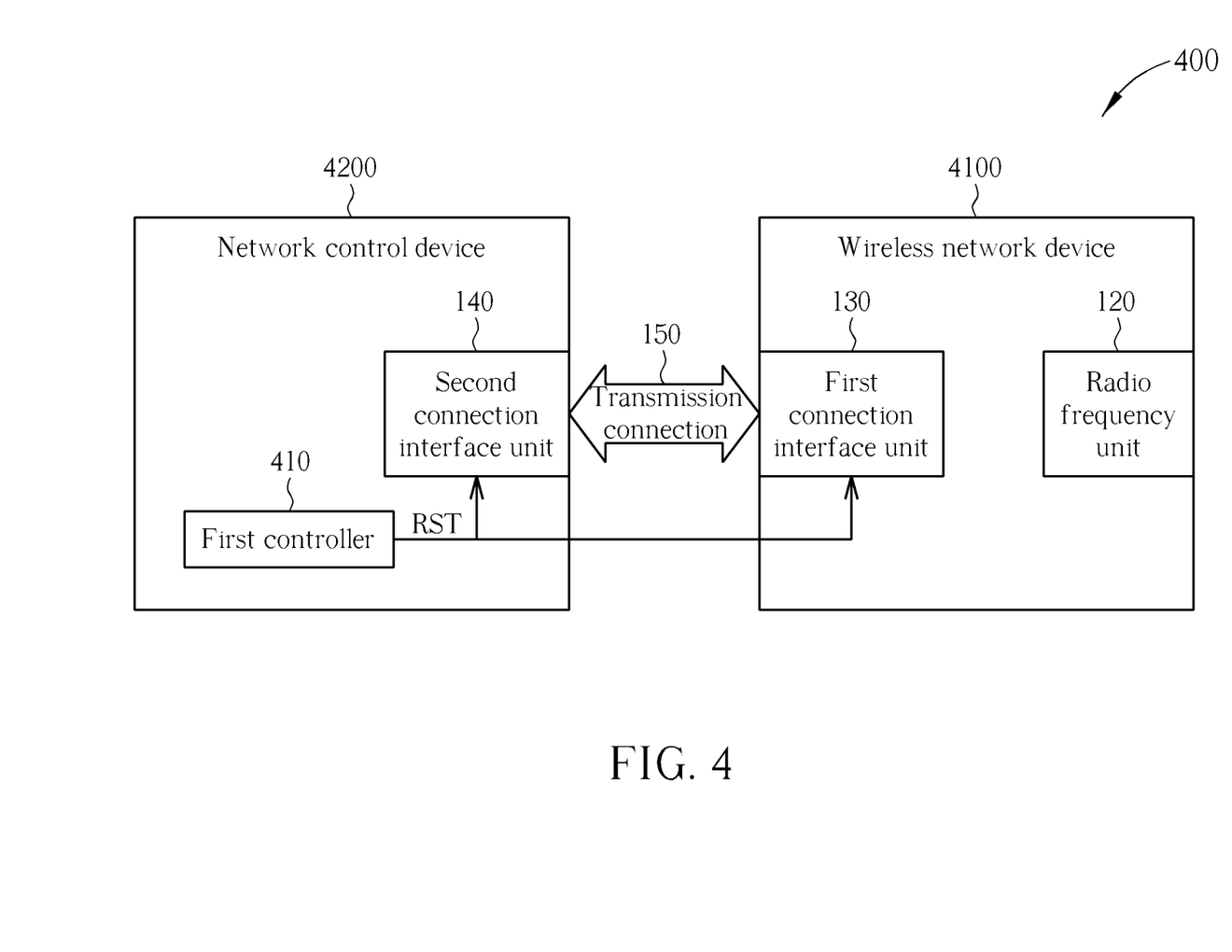
FIG. 4 is a diagram of a fourth exemplary embodiment of a network system.

Please refer to FIG. 4. FIG. 4 is a diagram of a fourth exemplary embodiment of a network system 400. The architecture of the network system 400 shown in FIG. 4 is similar to that of the network system 100 shown in FIG. 1, and the difference between them is that a first controller 410 of the network control device 4200 further sends out a reset signal RST to the first connection interface unit 130 and the second connection interface unit 140 for resetting them. In other words, in FIG. 4, the network control device 4200 can wake the wireless network device 4100 up through the reset signal RST. Please note that the reset signal RST herein can be implemented by a GPIO pin, but the scope of the present invention is not limited to this embodiment.

Furthermore, when there is no data transmitted via the transmission connection 150, the RF unit 120 still can transmit/receive frames normally. That is to say, when the network control device 4200 wakes the wireless network device 4100 through the reset signal RST, it will not reset the RF unit 120. Therefore, the firmware update time needed for resetting the RF unit 120 can be saved, in order to speed up waking the wireless network device 4100 up. Please note that, the network control device 4200 is used for storing a firmware. In the prior art, when the network control device 4200 is reset, the network system updates the firmware. That is to say, the wireless network device 4100 downloads the firmware from the network control device 4200, and then executes the firmware to perform operations. In this embodiment, even though the network control device 4200 wakes the wireless network device 4100 through the reset signal RST, the wireless network device 4100 won't download the firmware from the network control device 4200 again. Therefore, the time for updating the firmware can be saved.

Figure 5:
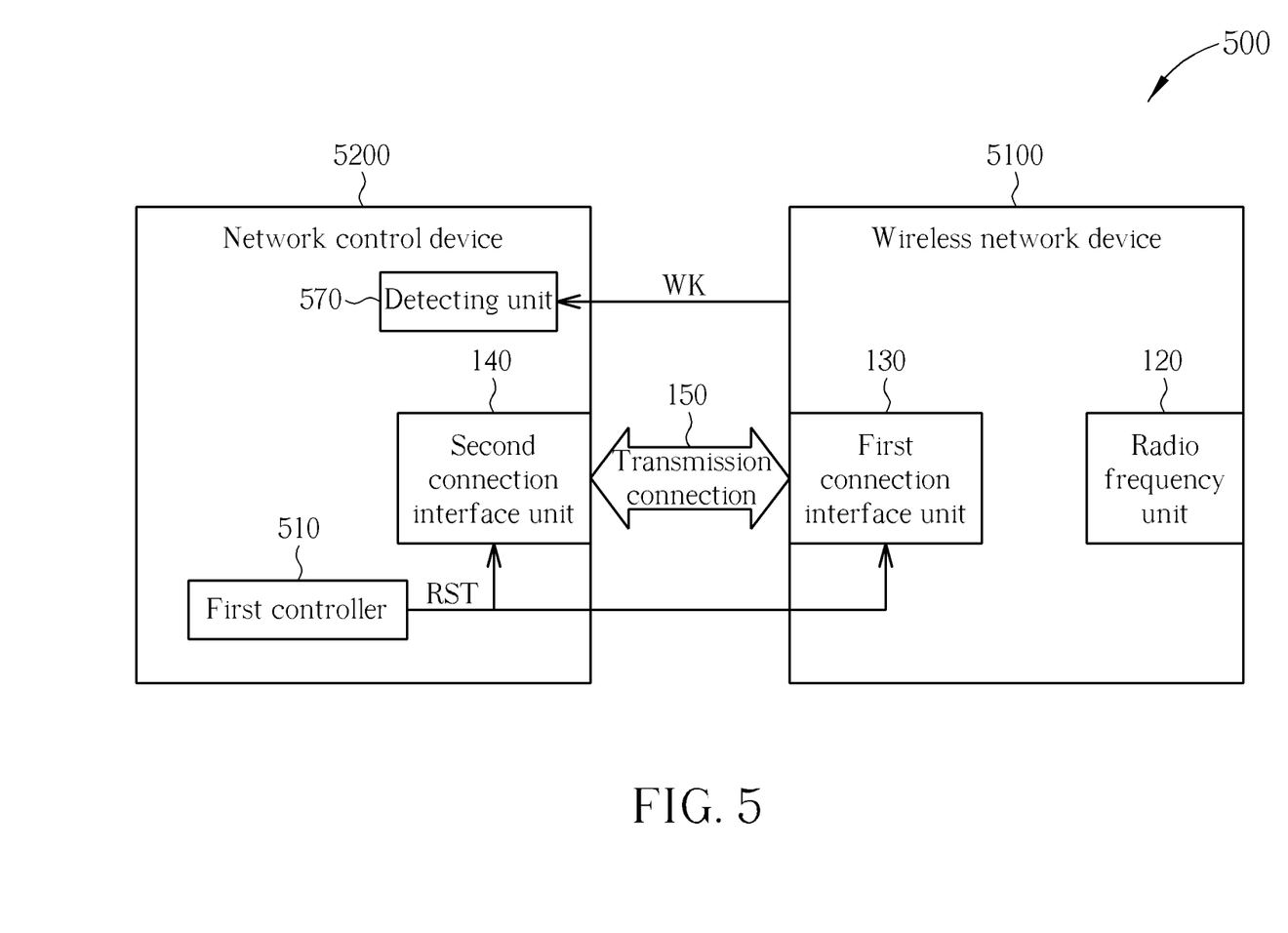
FIG. 5 is a diagram of a fifth exemplary embodiment of a network system.

Please refer to FIG. 5. FIG. 5 is a diagram of a fifth exemplary embodiment of a network system 500. The architecture of the network system 500 shown in FIG. 5 is similar to that of the network system 400 shown in FIG. 4, and the difference between them is that a network control device 5200 of the network system 500 further includes a detecting unit 570, for detecting whether a wake-up signal WK is generated by the wireless network device 5100, wherein the wake-up signal WK indicates that there is data to be transmitted via the transmission connection 150. What calls for special attention is that: when the detecting unit 570 detects the wake-up signal WK, the first controller 510 restarts the at least one of power supplies of the first connection interface unit 130 and the second connection interface unit 140 used to be turned off. When the detecting unit 570 detects the wake-up signal WK, the first controller 510 further sends out a reset signal RST to the first connection interface unit 130 and the second connection interface unit 140 for resetting them. In other words, in FIG. 5, the wireless network device 5100 can wake the network control device 5200 through the wake-up signal WK, and both of the first connection interface unit 130 and the second connection interface unit 140 are reset by the first controller 510. Please note that the wake-up signal WK and/or the reset signal RST herein can be implemented by GPIO pin(s). However, the scope of the present invention is not limited to this embodiment.

Figure 6:
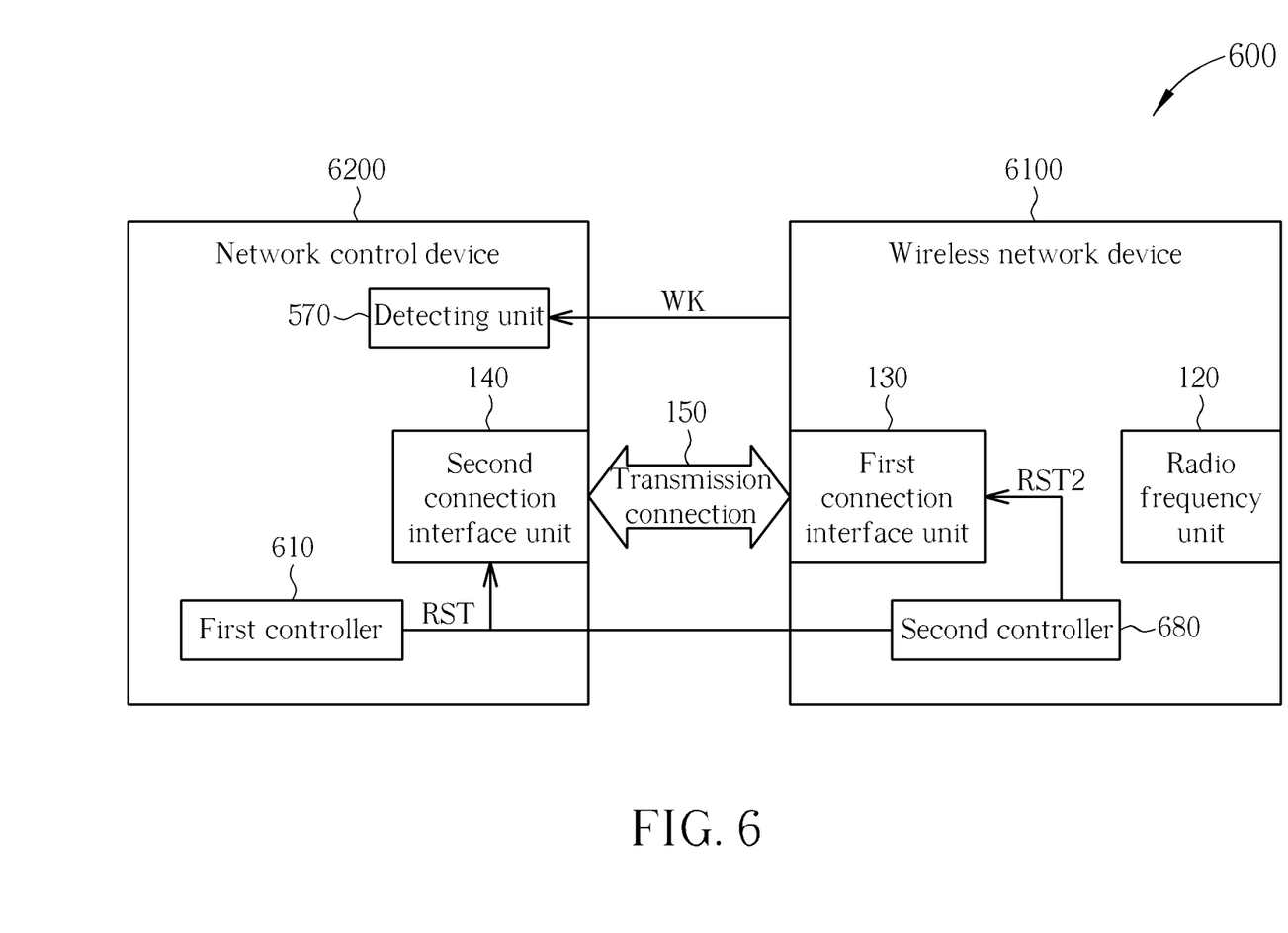
FIG. 6 is a diagram of a sixth exemplary embodiment of a network system.

Please refer to FIG. 6. FIG. 6 is a diagram of a sixth exemplary embodiment of a network system 600. The architecture of the network system 600 shown in FIG. 6 is similar to that of the network system 500 shown in FIG. 5, and the difference between them is that the network system 600 further includes a second controller 680. When the detecting unit 570 of the network control device 6200 detects the wake-up signal WK, the first controller 610 further sends out the reset signal RST to the second connection interface unit 140 and the second controller 680. After that, when the reset signal RST is received by the second controller 680, the second controller 680 sends out another reset signal RST2 to reset the first connection interface unit 130. In other words, in FIG. 6, the wireless network device 6100 can wake the network control device 6200 up through the wake-up signal WK, and the first connection interface unit 130 and the second connection interface unit 140 are reset by different controllers (i.e., the first controller 610 and the second controller 680), respectively.

In this embodiment, the first controller 610 is disposed in the network control device 6200 while the second controller 680 is disposed in the wireless network device 6100, but the scope of the present invention is not limited to this embodiment. In other embodiments (not shown), the first controller 610 may be disposed in the wireless network device 6100 of the network system 600 in order to generate the reset signal RST to the first connection interface unit 130 and the second controller 680, while the second controller 680 may be disposed in the network control device 6200 in order to send out the reset signal RST2 for resetting the second connection interface unit 140 when the reset signal RST is received.

Figure 7:
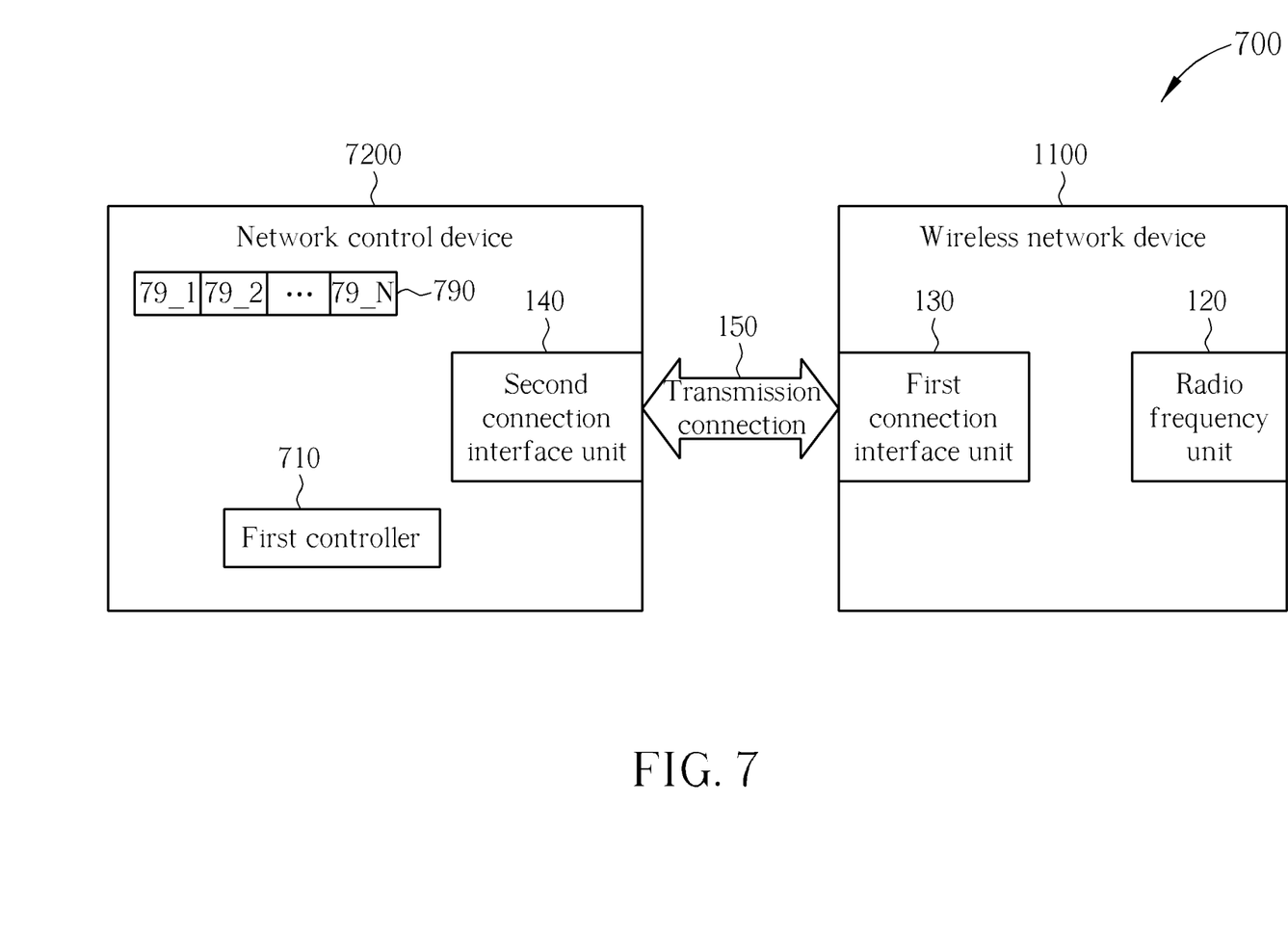
FIG. 7 is a diagram of a seventh exemplary embodiment of a network system.

Please refer to FIG. 7. FIG. 7 is a diagram of a sixth exemplary embodiment of a network system 700. In this embodiment, a network control device 7200 of the network system 700 further includes a network switch 790 for switching information. The network switch 790 includes a plurality of transport ports 79_1~19_N. The first controller 710 further determines the network system enters an access point (AP) mode or a router mode to decide whether to turn off or turn on the power supply of at least one transport port of the plurality of transport ports 79_1~79_N. That is to say, when the network system 700 enters the AP mode, the first controller 710 further turns off the power supply of at least one transport port of the plurality of transport ports 79_1~79_N; and when the network system 700 enters the router mode, the first controller 710 restarts the power supply of the at least one transport port 79_1~79_N used to be turned off. For example, when the network system 700 enters the AP mode, the first controller 710 only keeps turning on the power supply of the transport port 79_1 while the power supplies of all the other transport ports 79_2~79_N are turned off. When the network system 700 enters the AP mode, the first controller 710 restarts the power supplies of the transport ports 79_2~79_N.

Figure 8:
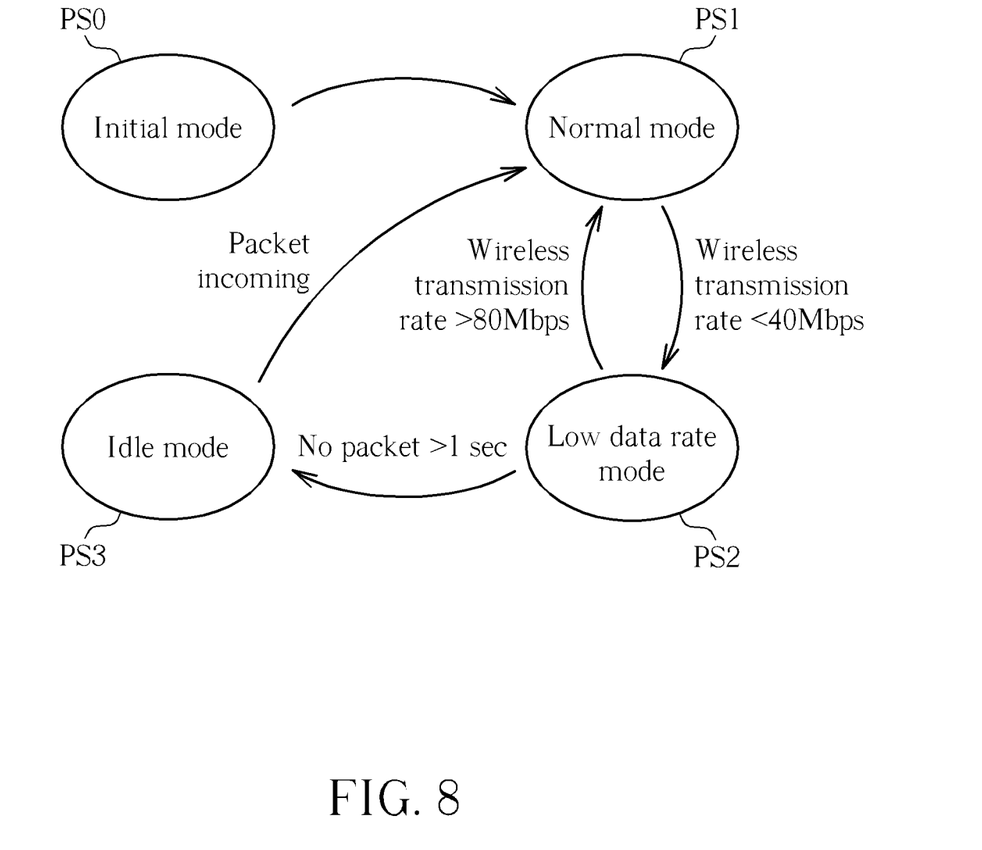
FIG. 8 is a diagram illustrating power states of an exemplary embodiment of the network system.

Please refer to FIG. 8. FIG. 8 is a diagram illustrating power states of an exemplary embodiment of the network system, which is suitable for any one of the network systems 100~700 shown in FIG. 1-FIG. 7 (or their varied embodiments). As shown in FIG. 8, the network system includes a plurality of power states, including: an initial mode PS0, a normal mode PS1 (can also be called "a high data rate mode"), a low data rate mode PS2, and an idle mode PS3. At beginning, the network system is switched to the AP mode, and thus the network system is under the initial mode PS0. After the AP mode of the network system is initialized, the network system then enters the normal mode PS1. When the network system has a lower data transmission rate (e.g., its wireless transmission rate is smaller than 40 Mbps), the network system enters the low data rate mode PS2. When the wireless transmission rate of the network system is raised (e.g., the wireless transmission rate is greater than 80 Mbps), the network system restore to the normal mode PS1. Please note that, after the network system enters the low data rate mode PS2, the network system may directly enter the idle mode PS3 for reducing power consumption if there is no packet received after a period of time (e.g., more than 1 second). Until continuous packets are received, the network system then restores to the normal mode PS1.

Please note that, the abovementioned first controller can adjust a processing rate of the first controller according to a transmission rate of the data transmitted via the transmission connection 150. In other words, when the network system is under the normal mode PS1 (can also called as the high data rate mode), the processing rate of the first controller can be adjusted to be higher; when the network system is under the low data rate mode PS2, the processing rate of the first controller can be adjusted to be slower; and when the network system is under the idle mode PS3, the processing rate of the first controller can be adjusted to be a suspend state in order to save more power.

Figure 9:
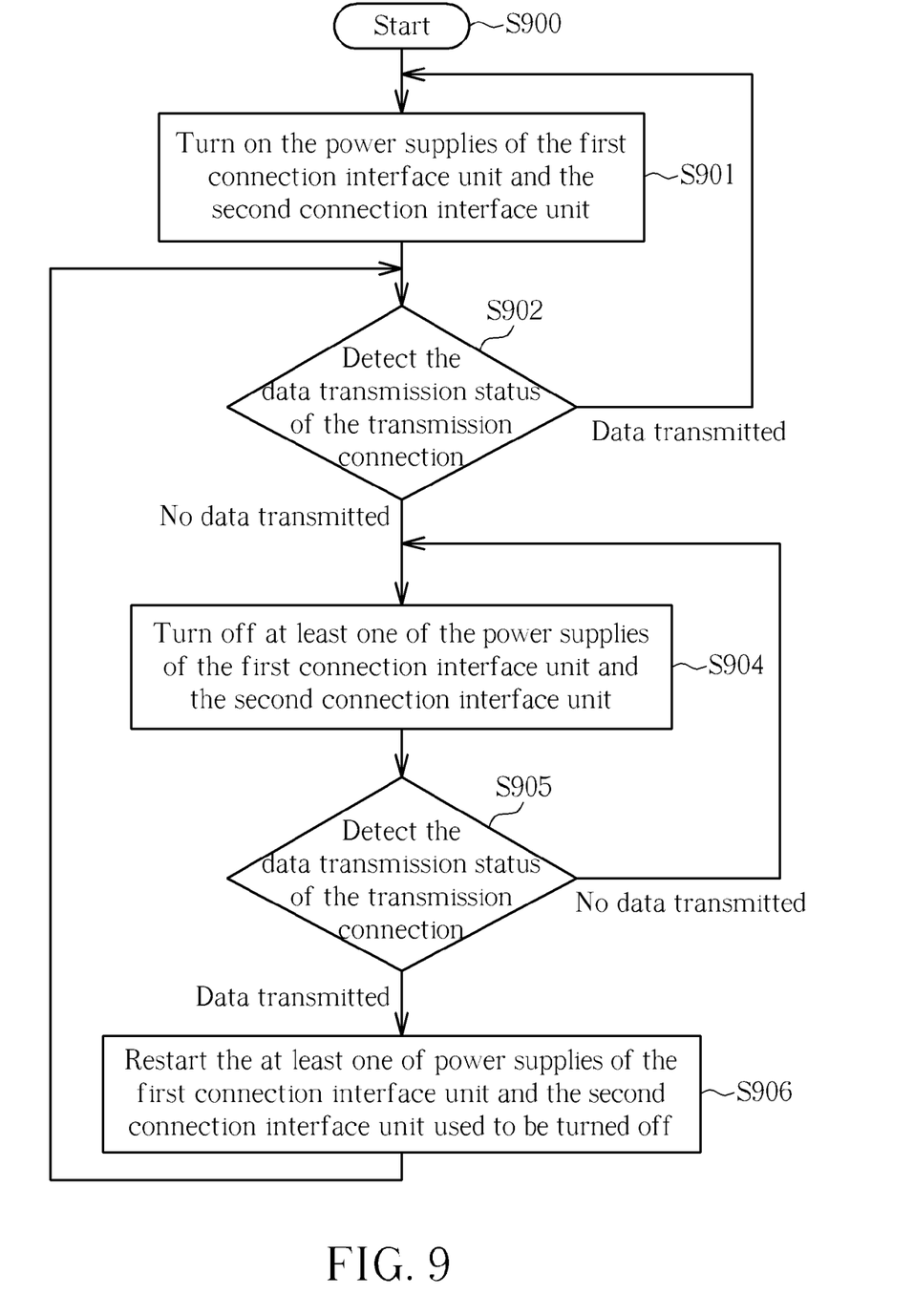
FIG. 9 is a flowchart illustrating an exemplary embodiment of a power saving method applied to a network system.

Please refer to FIG. 9. FIG. 9 is a flowchart illustrating a power saving method applied to an exemplary embodiment of a network system. Please note that the following steps are not limited to be performed according to the exact sequence shown in FIG. 9 if a roughly identical result can be obtained. The method includes, but is not limited to, the following steps:

Step S900: Start.

Step S901: Turn on the power supplies of the first connection interface unit and the second connection interface unit.

Step S902: Detect the data transmission status of the transmission connection. When there is not data transmitted via the transmission connection, go to the step S904; otherwise, to back to the step S901 to keeping turning on the power supplies of the first connection interface unit and the second connection interface unit.

Step S904: Turn off at least one of the power supplies of the first connection interface unit and the second connection interface unit.

Step S905: Detect the data transmission status of the transmission connection. When there is no data transmitted via the transmission connection, go back to the step S904 to keep turning off at least one of the power supplies of the first connection interface unit and the second connection interface unit; otherwise, go to the step S906.

Step S906: Restart the at least one of power supplies of the first connection interface unit and the second connection interface unit used to be turned off. After that, go to the step S902.

How each element operates can be known by collocating the steps shown in FIG. 9 and the elements shown in FIG. 1-FIG. 6, and further description is omitted here for brevity. What calls for special attention is that: the first controller determines whether to turn off or turn on the power supply of the first connection interface unit and/or the power supply of the second connection interface unit by detecting the data transmission status of the transmission connection.

Figure 10:
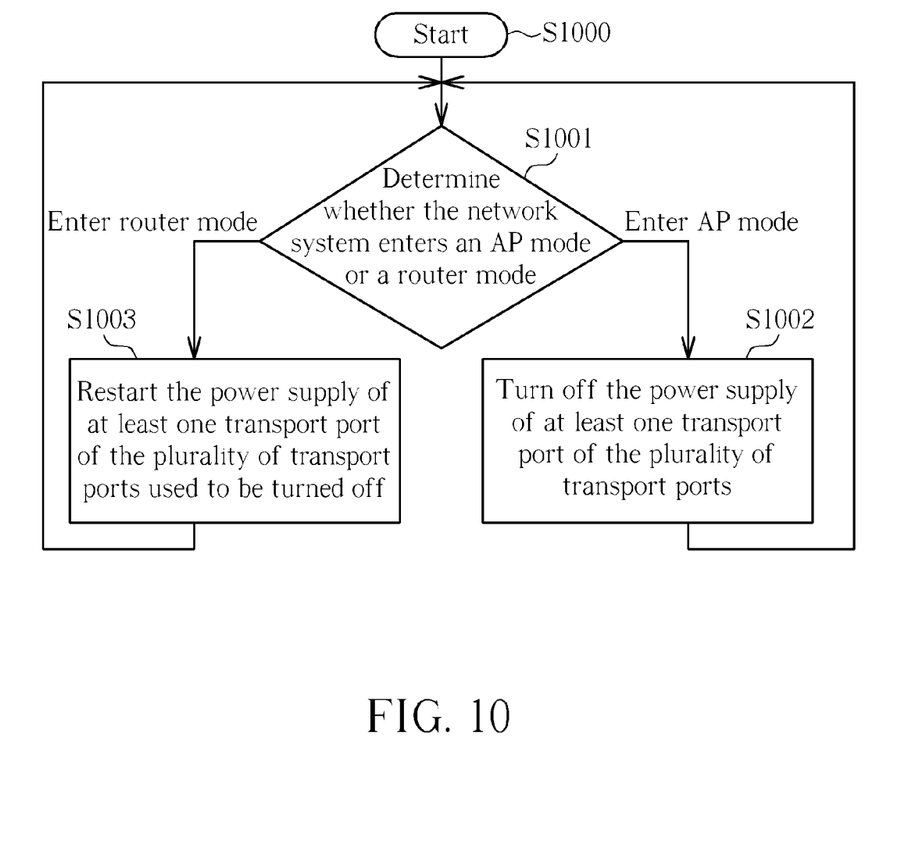
FIG. 10 is a flowchart illustrating an exemplary embodiment of a power saving method applied to a network system.

Please refer to FIG. 10. FIG. 10 is a flowchart illustrating a power saving method applied to an exemplary embodiment of a network system. Please note that the following steps are not limited to be performed according to the exact sequence shown in FIG. 10 if a roughly identical result can be obtained. The method includes, but is not limited to, the following steps:

Step S1000: Start.

Step S1001: Determine whether the network system enters an AP mode or a router mode. When the network system enters the AP mode, go to the step S1002; when the network system enters the router mode, go to the step S1003.

Step S1002: Turn off the power supply of at least one transport port of the plurality of transport ports. After that, go back to the step S1001.

Step S1003: Restart the power supply of at least one transport port of the plurality of transport ports used to be turned off. After that, go back to the step S1001.

Please note that, in one embodiment, the steps S1001, S1002 and S1003 are executed by the first controller.

Please note that, the steps of the abovementioned flowcharts are merely practicable embodiments, and in no way should be considered to be limitations of the scope of the present invention. The methods can include other intermediate steps or several steps can be merged into a single step without departing from the spirit of the present invention.

The abovementioned embodiments are presented merely for describing the features of the present invention, and in no way should be considered to be limitations of the scope of the present invention. In summary, the present invention provides methods and apparatuses of a network system with power saving functions. When there is no data transmitted via the transmission connection in the network system, at least one of the power supplies of the connection interface unit of the wireless network device and the connection interface unit of the network control device can be turned off, in order to achieve a goal of saving power. Moreover, after the network system enters the AP mode, the power supplies of unused transport ports can be turned off to avoid waste of power consumption. Additionally, a wake-up mechanism and a reset mechanism can be involved in resetting the network system and resetting the inactivated power supplies quickly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network system with power saving functions, comprising:
a wireless network device, comprising:
a radio frequency (RF) unit, for transmitting and receiving frames; and
a first connection interface unit;
a network control device, comprising:
a second connection interface unit, wherein the second connection interface unit is coupled to the first connection interface unit via a transmission connection, for data transmission with the first connection interface unit;
a first controller, for turning off power supplies of the first connection interface unit and the second connection interface unit when there is no data transmitted via the transmission connection; wherein in response to detecting a wake-up signal by a detecting unit in the network control device, the first controller restarts at least one of the power supplies of the first connection interface unit and the second connection interface unit previously in a turned off state; and
a second controller, for resetting the first connection interface unit in response to receiving a reset signal, wherein in response to the wake-up signal, the first controller transmits the reset signal to the second connection interface unit and the second controller.

2. The network system of claim 1, wherein the network control device further comprises:
a storage unit, wherein the first controller further turns off a power supply of the storage unit when there is no data transmitted via the transmission connection.

3. The network system of claim 2, wherein the storage unit comprises a synchronous dynamic random access memory (SDRAM).

4. The network system of claim 1, wherein when the detecting unit detects the wake-up signal, the first controller further sends out a reset signal to the first connection interface unit.

5. The network system of claim 1, wherein the first controller is disposed in the network control device, and the second controller is disposed in the wireless network device.

6. The network system of claim 1, wherein the first controller is disposed in the wireless network device, and the second controller is disposed in the network control device.

7. The network system of claim 1, wherein the first controller further sends out a reset signal to the first connection interface unit and the second connection interface unit, in order to reset the first connection interface unit and the second connection interface unit.

8. The network system of claim 1, wherein the network control device further comprises:
a network switch, comprising a plurality of transport ports for switching information;
wherein when the network system is switched to an access point (AP) mode from a router mode, the first controller turns off at least one of power supplies of the plurality of transport ports.

9. The network system of claim 8, wherein when the network system is switched to the router mode from the AP mode, the first controller further restarts the at least one of the power supplies of the plurality of transport ports used to be turned off.

10. The network system of claim 1, wherein the transmission connection conforms to a peripheral component interconnect (PCI) standard, a PCI-Express standard, a mini-PCI standard, or a universal serial bus (USB) standard.

11. The network system of claim 1, wherein the first controller further adjusts a processing rate of the first controller according to a transmission rate of the data transmitted via the transmission connection.

12. A network control device, comprising:
a network switch, comprising a plurality of transport ports, for switching information; and
a controller, coupled to the network switch;
wherein when at least one transport port of the plurality of transport ports is not linked, the controller turns off a power supply of the at least one unlinked transport port; the network control device is applied to a network system; when the network system enters an AP mode, the controller turns off the power supply of the at least one unlinked transport port of the plurality of transport ports; and when the network system enters a router mode, the controller restarts the power supply of the at least one transport port previously in a turned off state.

13. A power saving method applied to a network system, the network system comprising a wireless network device and a network control device, the wireless network device comprising an RF unit for transmitting and receiving frames and a first connection interface unit, the network control device comprising a second connection interface unit being coupled to the first connection interface unit via a transmission connection, the power saving method comprising:
detecting a data transmission status of the transmission connection;
when there is no data transmitted via the transmission connection, turning off power supplies of the first connection interface unit and the second connection interface unit;
in response to the network system entering the AP mode, turning off the power supply of at least one transport port of the plurality of transport ports; and
in response to the network system entering the router mode, restarting the power supply of the at least one transport port previously in a turned off state.

14. The power saving method of claim 13, wherein restarting the power supply of the at least one transport port comprises restarting only the power supply of the at least one transport port previously in a turned off state.

15. A network system with power saving functions, comprising:
a wireless network device, comprising:
a radio frequency (RF) unit, for transmitting and receiving frames; and
a first connection interface unit;
a network control device, comprising:
a second connection interface unit, wherein the second connection interface unit is coupled to the first connection interface unit via a transmission connection, for data transmission with the first connection interface unit;
a first controller, for turning off at least one of power supplies of the first connection interface unit and the second connection interface unit when there is no data transmitted via the transmission connection;
a detecting unit, for detecting whether a wake-up signal is generated by the wireless network device, wherein the wake-up signal indicates that there is data to be transmitted via the transmission connection; and
a second controller, for resetting the first connection interface unit when receiving a reset signal;

wherein when the detecting unit detects the wake-up signal, the first controller restarts the at least one of power supplies of the first connection interface unit and the second connection interface unit previously in a turned off state, and the first controller further sends out the reset signal to the second connection interface unit and the second controller.

* * * * *